United States Patent
Su et al.

(10) Patent No.: US 7,924,504 B2
(45) Date of Patent: Apr. 12, 2011

(54) COLOR FILTER STRUCTURE HAVING INORGANIC LAYERS

(75) Inventors: Chao-An Su, Kaohsiung County (TW); Tzung-I Su, Yun-Lin County (TW); Ching-Hung Kao, Hsin-Chu Hsien (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 627 days.

(21) Appl. No.: 11/968,187

(22) Filed: Jan. 1, 2008

(65) Prior Publication Data

US 2009/0168181 A1     Jul. 2, 2009

(51) Int. Cl.
*G02B 1/10*     (2006.01)
(52) U.S. Cl. .. 359/586; 359/588; 359/589; 257/E31.121
(58) Field of Classification Search .......... None
See application file for complete search history.

(56) References Cited

U.S. PATENT DOCUMENTS

| | | | | |
|---|---|---|---|---|
| 5,801,373 A * | 9/1998 | Oozu et al. | ............... | 250/208.1 |
| 2005/0110002 A1* | 5/2005 | Noda | ............... | 257/21 |
| 2007/0058055 A1* | 3/2007 | Yamaguchi et al. | ........... | 348/272 |
| 2007/0187793 A1* | 8/2007 | Moon et al. | ............... | 257/440 |

FOREIGN PATENT DOCUMENTS

EP           223136 A2 *   5/1987
WO   WO 2005013369 A1 *   2/2005

* cited by examiner

*Primary Examiner* — Arnel C Lavarias
(74) *Attorney, Agent, or Firm* — Winston Hsu; Scott Margo

(57) ABSTRACT

A color filter structure includes a substrate, in which a number of first pixel regions, a number of second pixel regions, and a number of third pixel regions are defined on the substrate. Each first pixel region includes a first stack layer; each second pixel region includes a second stack layer; and each third pixel region includes the first stack layer and the second stack layer.

4 Claims, 17 Drawing Sheets

COLOR FILTER STRUCTURE HAVING INORGANIC LAYERS

BACKGROUND OF THE INVENTION

1. Field of the Invention

The present invention relates to a color filter and a method for fabricating the same, and more particularly, to an inorganic color filter and a method for fabricating the same.

2. Description of the Prior Art

As the development of digital cameras, scanners, and other electronic products progresses, the demand for image sensor increases accordingly. In general, today's image sensors in common usages are divided into two main categories: charge coupled device (CCD) sensors and complementary metal oxide semiconductor image sensors (CMOS image sensors; CIS). The application of CMOS image sensors has been widely adopted for several reasons as described hereinafter. Primarily, CMOS image sensors have advantages such as offering a lower operating voltage, reduced power consumption, and the ability for random access. Additionally, CMOS image sensors are currently capable of integration with the semiconductor fabrication process.

Please refer to FIG. 1, which illustrates a typical structure of a camera system. As shown in FIG. 1, the camera system includes a CMOS image sensor 10, a driving circuit 12, a vertical scan circuit 14, a horizontal scan circuit 16, and an analog front end 18, a signal processing circuit 20, and a control unit 22. The CMOS image sensor 10 includes a plurality of first pixel regions 100a, a plurality of second pixel regions 100b, and a plurality of third pixel regions 100c; and the pixel regions 100a, 100b, 100c are arranged substantially in an array such as the Bayer pattern color filter array. Each pixel region can receive a predetermined wavelength of light respectively, and a charge signal corresponding to the strength of the incident light is generated.

Each first pixel region 100a, each second pixel region 100b, and each third pixel region 100c in FIG. 1 are also designated as R, G, and B, respectively. Namely, each first pixel region 100a is provided with a color filter that transmits light in the red wavelength range; each second pixel region 100b is provided with a color filter that transmits light in the green wavelength range; and each third pixel region 100c is provided with a color filter that transmits light in the blue wavelength range.

The driving circuit 12 drives the vertical scan circuit 14 and the horizontal scan circuit 16 based on a trigger signal from the control unit 22. The vertical scan circuit 14 subsequently activates the pixel regions in the CMOS image sensor 10, thereby making the pixel regions to form charge signal. The vertical scan circuit 14, then, transfers the charge signals in the activated pixel regions to the horizontal scan circuit 16. Using the driving circuit 12, the vertical scan circuit 14 and the horizontal scan circuit 16, the charge signals produced in the pixel regions that are disposed in an array can be converted into voltage signals; and then the voltage signals are outputted to the analog front end 18. The analog front end 18 gathers and amplifies the voltage signals, converts the analog signals into the digital signals, and then outputs the digital signals to the signal processing circuit 20. The signal processing circuit 20, which further includes a matrix-holding unit (not shown), converts the digital signals into a red signal, a green signal, and a blue signal by performing matrix calculations, thereby generating an imaging data.

Please refer to FIG. 2, which is a cross-sectional diagram illustrating the CMOS image sensor 10 in FIG. 1. FIG. 2 merely shows a first pixel region, a second pixel region and a third pixel region. As shown in FIG. 2, The CMOS image sensor 10 is fabricated on a semiconductor substrate 102 such as a silicon substrate. The semiconductor substrate 102 comprises a plurality of first pixel regions 100a, a plurality of second pixel regions 100b, and a plurality of third pixel regions 100c. The semiconductor substrate 102 further comprises a photodiode layer 104; and the photodiode layer 104 comprises a plurality of photodiodes 106, disposed in each first pixel region 100a, each second pixel region 100b, and each third pixel region 100c, respectively, to be used for photoelectric conversions. Generally, photodiode 106 is formed by implanting conductive ions into the semiconductor substrate 102. There is further an insulation layer 108, positioned on the photodiode layer 104, to be used for isolating the photodiode layer 104 and a color filter forming layer 112, which is disposed on the insulator layer 108. Usually, the insulation layer 108 is composed of insulating materials such as silicon oxide. The insulation layer 108 further comprises a plurality of optical shielding layers 110 for preventing interferences caused by light scattered to adjacent pixel regions. Additionally, the color filter forming layer 112 comprises a plurality of color filters 114, which are disposed in each first pixel region 100a, each second pixel region 100b, and each third pixel region 100c, respectively. When an incident light 118 is passed through a micro lens 116 used for providing the focusing, the color filter 114, and the insulation layer 108, the incident light 118 then reaches the photodiode 106; consequently, a corresponding charge signal is thereby generated.

It should be noticed that because conventional color filters are manufactured by mixing organic chemical compounds such as acrylic resin along with pigments or dyestuff of different colors, therefore, the CMOS image sensors made of these organic materials have been facing issues such as degradation due to light exposure and having relatively low heat resistances. Besides, the manufacturing of the conventional color filters, however, requires a troublesome material management process for the pigments or dyestuff of different colors used in the manufacturing process; therefore, this significantly increased the manufacturing costs of the CMOS image sensors.

Accordingly, an inorganic color filter and a method for fabricating the same are provided to improve upon the deficiencies from the conventional organic color filters, for thereby allowing the CMOS image sensors to perform under higher temperature environment.

SUMMARY OF THE INVENTION

The present invention relates to a color filter and a method for fabricating the same, and more particularly, to an inorganic color filter and a method for fabricating the same for overcoming degradation due to the exposure under higher temperature environment.

According to the claims of the present invention, a color filter is provided. The color filter comprises a substrate, in which a plurality of first pixel regions, a plurality of second pixel regions, and a plurality of third pixel regions are defined on the substrate. Each first pixel region comprises a first stack layer, each second pixel region comprises a second stack layer, and each third pixel region comprises the first stack layer and the second stack layer.

According to the claims of the present invention, a method for fabricating a color filter is further provided. First, a substrate is provided, and a plurality of first pixel regions, a plurality of second pixel regions, and a plurality of third pixel regions are defined on the substrate. Subsequently, a first stack layer is formed on each second pixel region and each third pixel region. A dielectric layer is then formed on each first pixel region; and the dielectric layers and the first stack layers both having a same height thereby forming a planar surface on the substrate. Finally, a second stack layer is formed on each first pixel region and each second pixel region; and the second stack layers covers the dielectric layers in the first pixel regions and covers the first stack layers in the second pixel regions, respectively.

The present invention utilizes inorganic materials to fabricate color filters; therefore, the problems of degradation of the organic color filters due to light exposure and due to relatively low heat resistances can be solved. Consequently, the CMOS image sensors having the inorganic color filters can be applied in higher temperature environment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
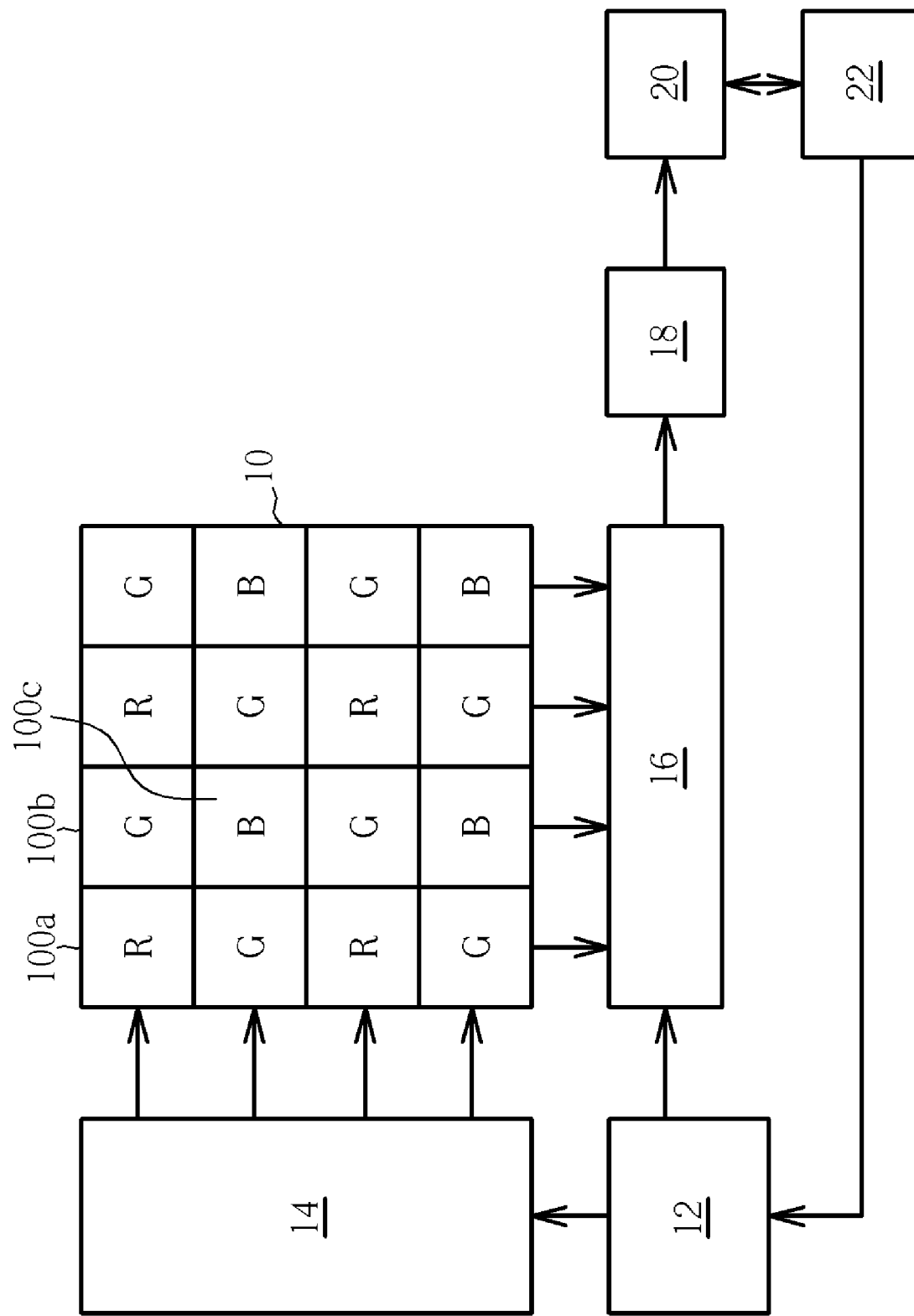
FIG. 1 illustrates a typical structure of a camera system.
Figure 2:
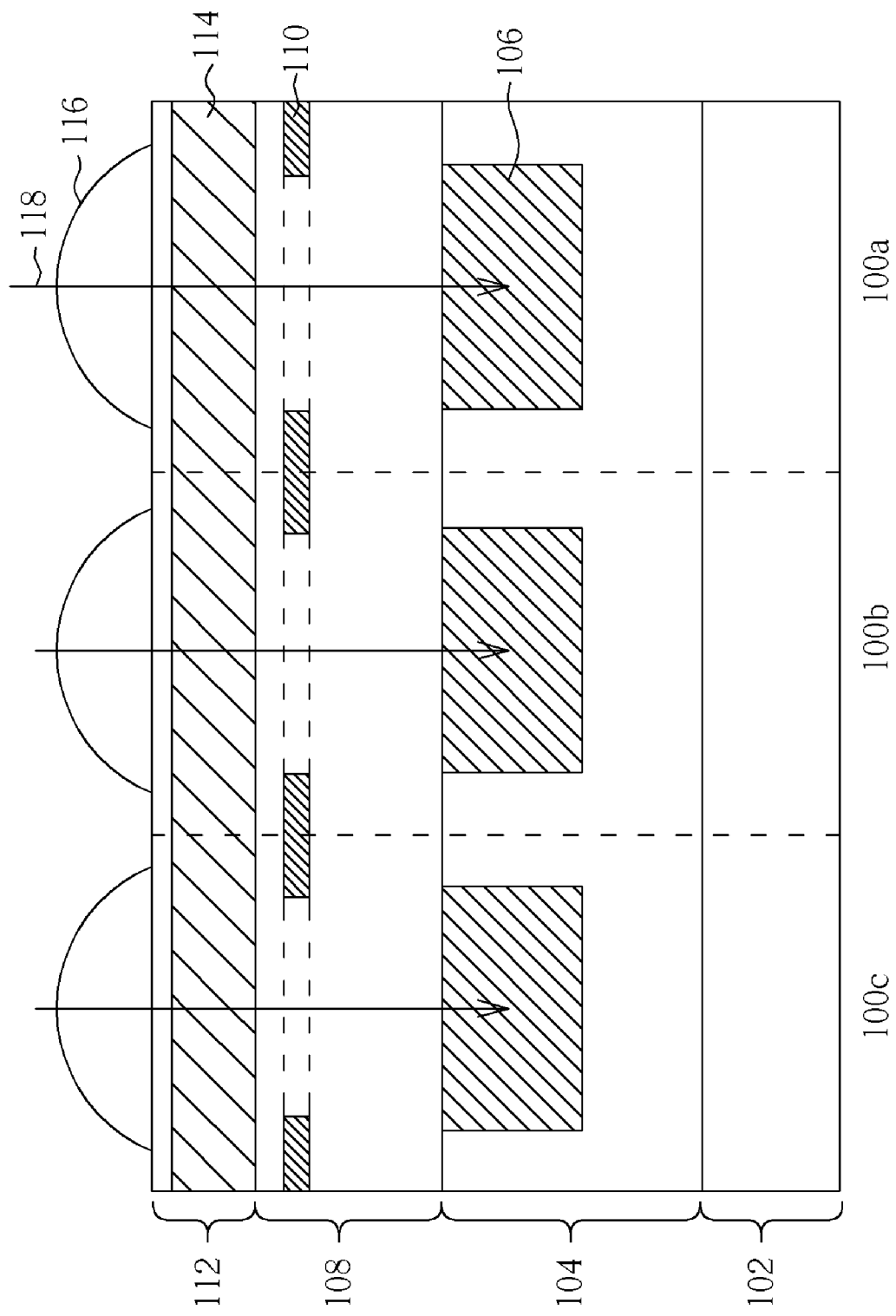
FIG. 2 is a cross-sectional diagram, illustrating a CMOS image sensor shown in FIG. 1.
Figure 3:
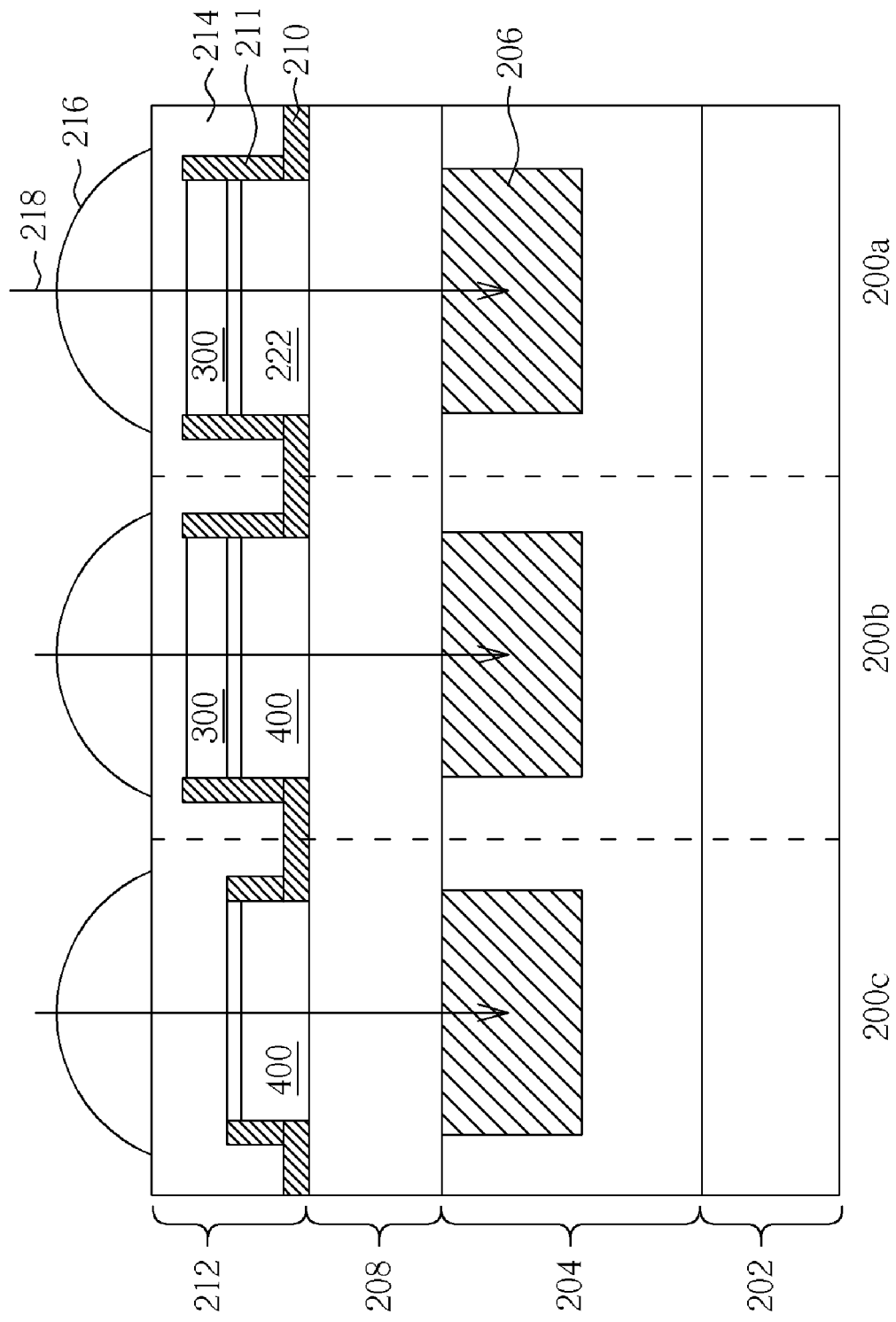
FIG. 3 is a cross-sectional diagram of a CMOS image sensor according to an embodiment of the present invention.

Please refer to FIG. 3, which is a cross-sectional diagram of a CMOS image sensor according to an embodiment of the present invention. The CMOS image sensor comprises a plurality of pixel regions, and the pixel regions can be arranged in any patterns to form a pixel array. Each respective pixel region within the pixel array is differentiated by having different color filters. For example, where a plurality of color filters are arranged in a pixel array and having adapted to transmit in the red (R), green (G), and blue (B) wavelength ranges, the pixel regions are differentiated as the red pixel regions (R), the green pixel regions (G), and the blue pixel regions (B). In the description that follows, an exemplary pixel array comprising these three kinds of color filters, (i.e., RGB filters) will be assumed as a working example. However, it should be understood that other color filters having various different colors are available, and that the invention is not limited to the use of only RGB color filters. For instance, if the color filters are arranged in a pixel array adapted to transmit four colors, then the cyan, magenta, yellow, and green color filters may be used instead. For highlighting the characteristic of the present invention and for clarity of illustration, FIG. 3 merely shows a red pixel region (R), a green pixel region (G), and a blue pixel region (B) designated as a first pixel region 200a, a second pixel region 200b and a third pixel region 200c, respectively.

Returning to FIG. 3, first, a semiconductor substrate 202 is provided, such as a silicon substrate. The semiconductor substrate 202 comprises a plurality of first pixel regions 200a, a plurality of second pixel regions 200b, and a plurality of third pixel regions 200c. The semiconductor substrate 202 further comprises a light sensing layer 204. The light sensing layer 204 comprises a plurality of light sensors such as a plurality of photodiodes 206, which are positioned in each first pixel region 200a, each second pixel region 200b, and each third pixel region 200c, respectively, to be used for photoelectric conversions. Generally, the photodiode 206 is formed by implanting conductive ions into the semiconductor substrate 202. There is further an insulation layer 208, positioned on the photodiode layer 204, used for isolating the photodiode layer 204 from a color filter forming layer 212 above the insulation layer 208. According to the embodiment of the present invention, the insulation layer 208 is composed of dielectric materials such as silicon oxide. The color filter forming layer 212 comprises a plurality of color filters 214 positioned in each first pixel region 200a, each second pixel region 200b, and each third pixel region 200c, respectively. The color filter 214 in the first pixel region 200a comprises a first stack layer 300, which is stacked by a plurality of inorganic layers, and a dielectric layer such as a silicon oxide layer 222. The color filter 214 in the third pixel region 200c comprises a second stack layer 400, which is stacked by a plurality of inorganic layers. The color filter 214 in the second pixel region 200b comprises a stacked structure constructed of the first stack layer 300 and the second stack layer 400. When an incident light 218 passes through a micro lens 216, the color filter 214, and the insulation layer 208, the incident light 218 then reaches the photodiode 206, thus consequently a relative charge signal is generated.

The biggest difference between the conventional CMOS image sensor and the present invention is the color filters being used. In the CMOS image sensor of the present invention, the color filters are made of alternating stacking structured inorganic materials. Therefore, the structure of the color filter and the method for fabricating the same according to the embodiment of the present invention will be described in detail hereinafter.

Figure 4:
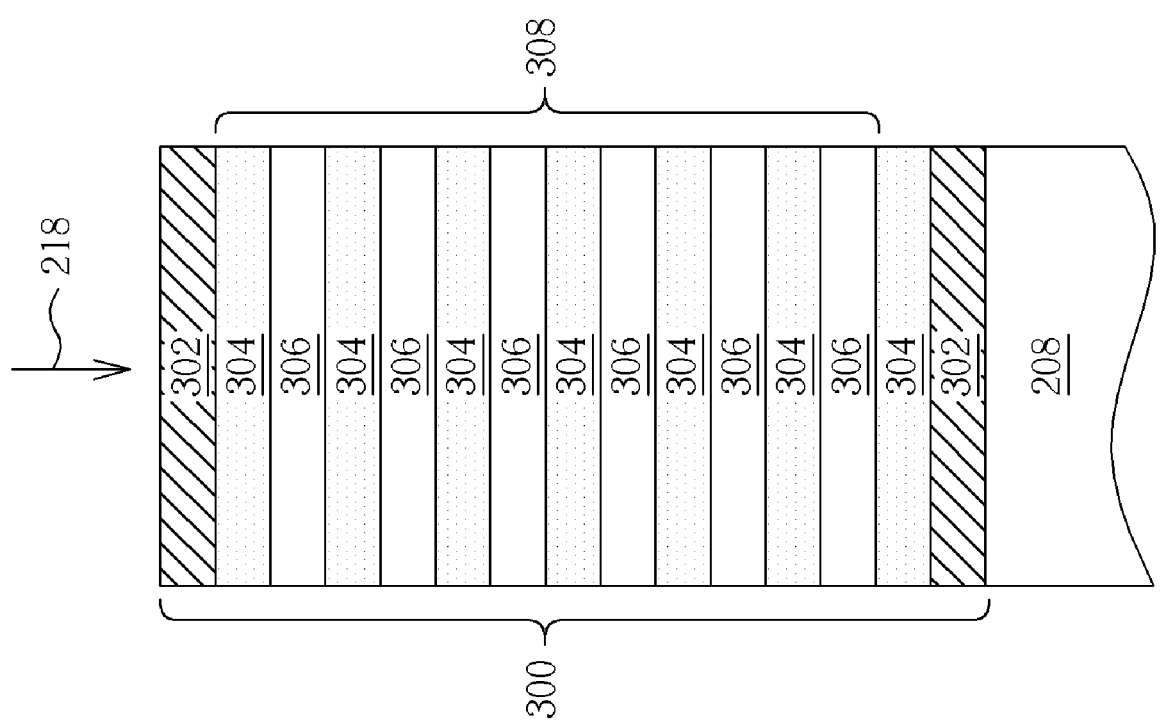
FIG. 4 illustrates a first stack layer of a color filter according to a preferred embodiment of the present invention.

Please refer to FIG. 4, which illustrates the first stack layer 300 of the color filter according to a preferred embodiment of the present invention. As shown in FIG. 4, the first stack layer 300 comprises a plurality of first inorganic layers 302, a plurality of second inorganic layers 304, and a plurality of third inorganic layers 306. In the first stack layer 300, two first inorganic layers 302 are disposed on the side of the incident light 218 and on the side of the insulation layer 208 respectively; and an alternating stacked structure 308 is further disposed between these two inorganic layers 302. The alternating stacked structure 308 is stacked alternately of the second inorganic layers 304 and the third inorganic layers 306. The first stack layer 300 further comprises a second inorganic layer 304 disposed between the first inorganic layer 302 at the side of the insulation layer 208 and the alternating stacked structure 308. According to the preferred embodiment of the present invention, each first inorganic layer 302 comprises a silicon nitride (SiN) layer; each second inorganic layer 304 comprises a silicon oxide ($SiO_2$) layer, and each third inorganic layer 306 comprises a silicon-oxy-nitride (SiON) layer. Each first inorganic layer 302, each second inorganic layer 304, and each third inorganic layer 306 has a thickness of about 400 to 800 angstroms; and the first stack layer 300 has a total thickness of about 9000 angstroms. Besides, according to the preferred embodiment of the present invention, the alternating stacked structure 308 is stacked alternately of the second inorganic layers 304 and the third inorganic layers 306 for a total of six times (equivalent to a total stack count of six). But the alternating total stack count is not limited to six; a total stack count of four to eight may also be used. It should be noticed that in the first stack layer 300, the stacking order of those three inorganic layers is not limited to the example described above; other stacking orders may also be used, but the stacked orders must be in a repetitive manner.

Figure 5:
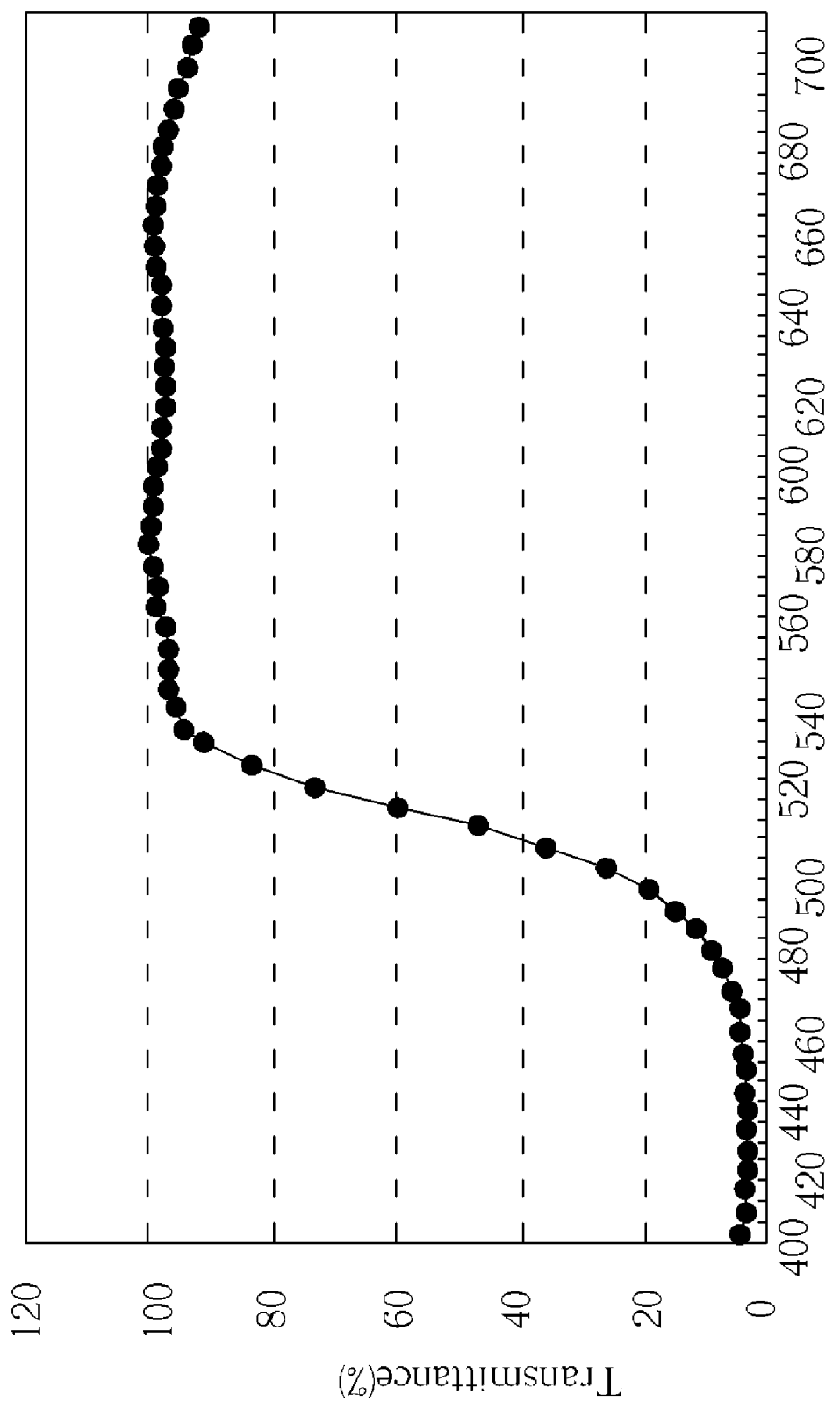
FIG. 5 is a transmission spectrum of the first stack layer according to the embodiment of the present invention.

Please refer to FIG. 5, which is a light transmission spectrum of the first stack layer 300. The abscissa of the spectrum is the wavelength (nm) and the ordinate is the transmittance (%). As shown in FIG. 5, the light having a wavelength higher than about 520 nm is transmitted through the first stack layer 300 with a transmittance of about 80 to 100%. Namely, the first stack layer 300 can transmit light having a wavelength higher than about 520 nm, but cuts off light having a wavelength lower than about 520 nm.

Figure 6:
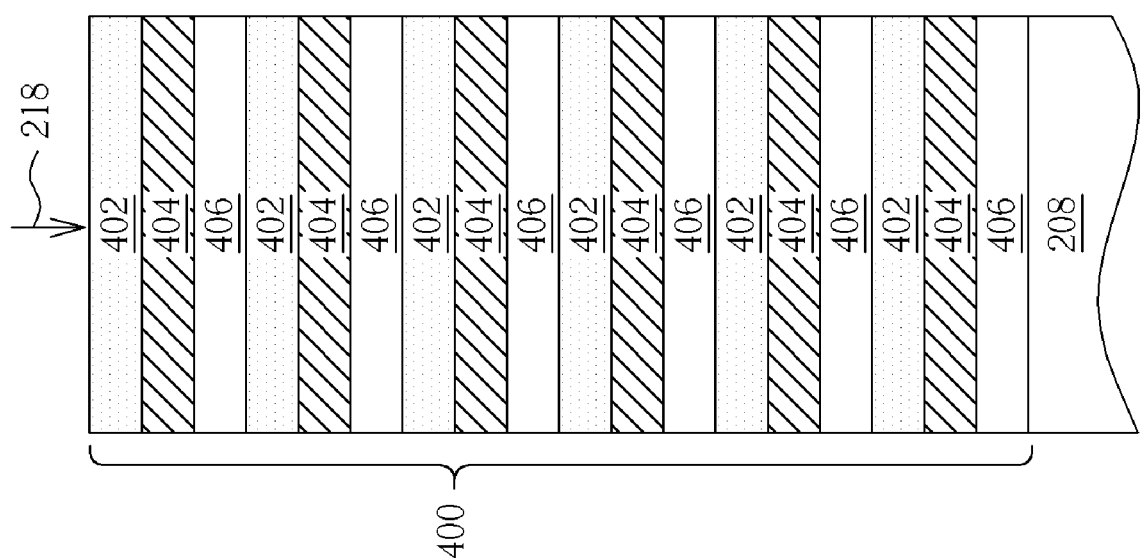
FIG. 6 illustrates a second stack layer of a color filter according to the embodiment of the present invention.

Please refer to FIG. 6, which illustrates the second stack layer 400 of the color filter according to the preferred embodiment of the present invention. As shown in FIG. 6, the second stack layer 400 comprises a plurality of fourth inorganic layers 402, a plurality of fifth inorganic layers 404, and a plurality of sixth inorganic layers 406. And the second stack layer 400 is stacked alternately in a sequence comprising the fourth inorganic layer 402, the fifth inorganic layer 404, and the sixth inorganic layer 406 from the side at the incident light 218 to the side at the insulation layer 208. According to the preferred embodiment of the present invention, the alternating total stack count is six, but not limited thereto, and the total stack count of four to eight may also be used. Besides, according to the preferred embodiment of the present invention, each fourth inorganic layer 402 comprises a silicon oxide layer, each fifth inorganic 404 layer comprises a silicon nitride layer, and each sixth inorganic 406 layer comprises a silicon-oxy-nitride layer. Each fourth inorganic layer 402 and the fifth inorganic layer 404 has a thickness of about 400 to 800 angstroms; and each sixth inorganic layer 406 has a thickness of about 200 to 500 angstroms. Thus the second stack layer 400 has a total thickness of about 12000 angstroms. It should be notice that in the second stack layer 400, the stacking order is not limited to that of the silicon oxide layer, the silicon nitride layer, and the silicon oxy-nitride layer described above, other stacked orders may be used, but the stacking orders must be in a repetitive manner.

Figure 7:
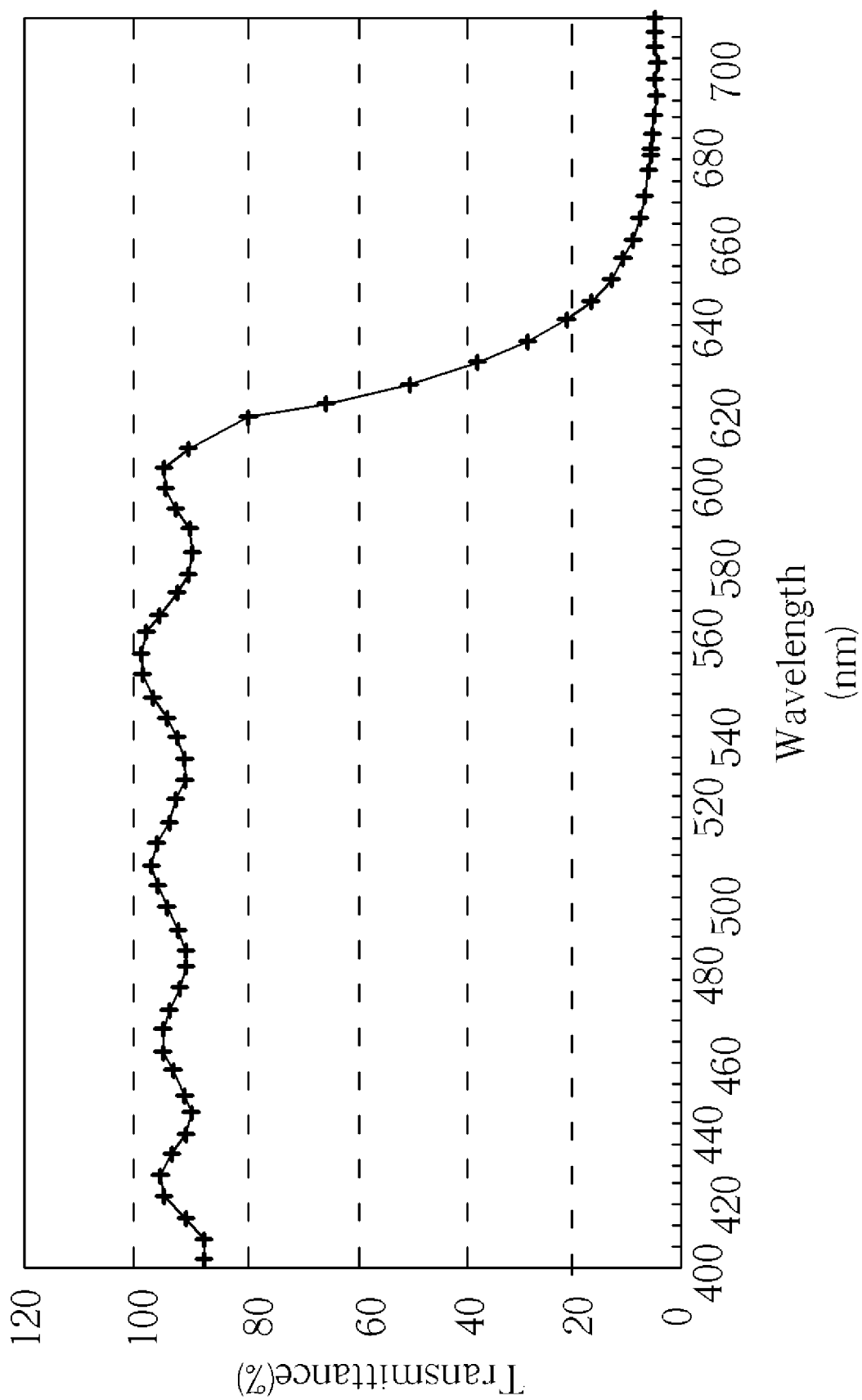
FIG. 7 is a transmission spectrum of the second stack layer according to the embodiment of the present invention.

Please refer to FIG. 7, which is a light transmission spectrum of the second stack layer 400. The abscissa of the spectrum is the wavelength (nm) and the ordinate is the transmittance (%). As shown in FIG. 7, the light having a wavelength lower than about 600 nm is transmitted through the second stack layer 400 with a transmittance of about 80 to 100%. Namely, the second stack layer 400 can transmit light having a wavelength lower than about 600 nm, but cuts off light having a wavelength higher than about 600 nm.

Figure 8:
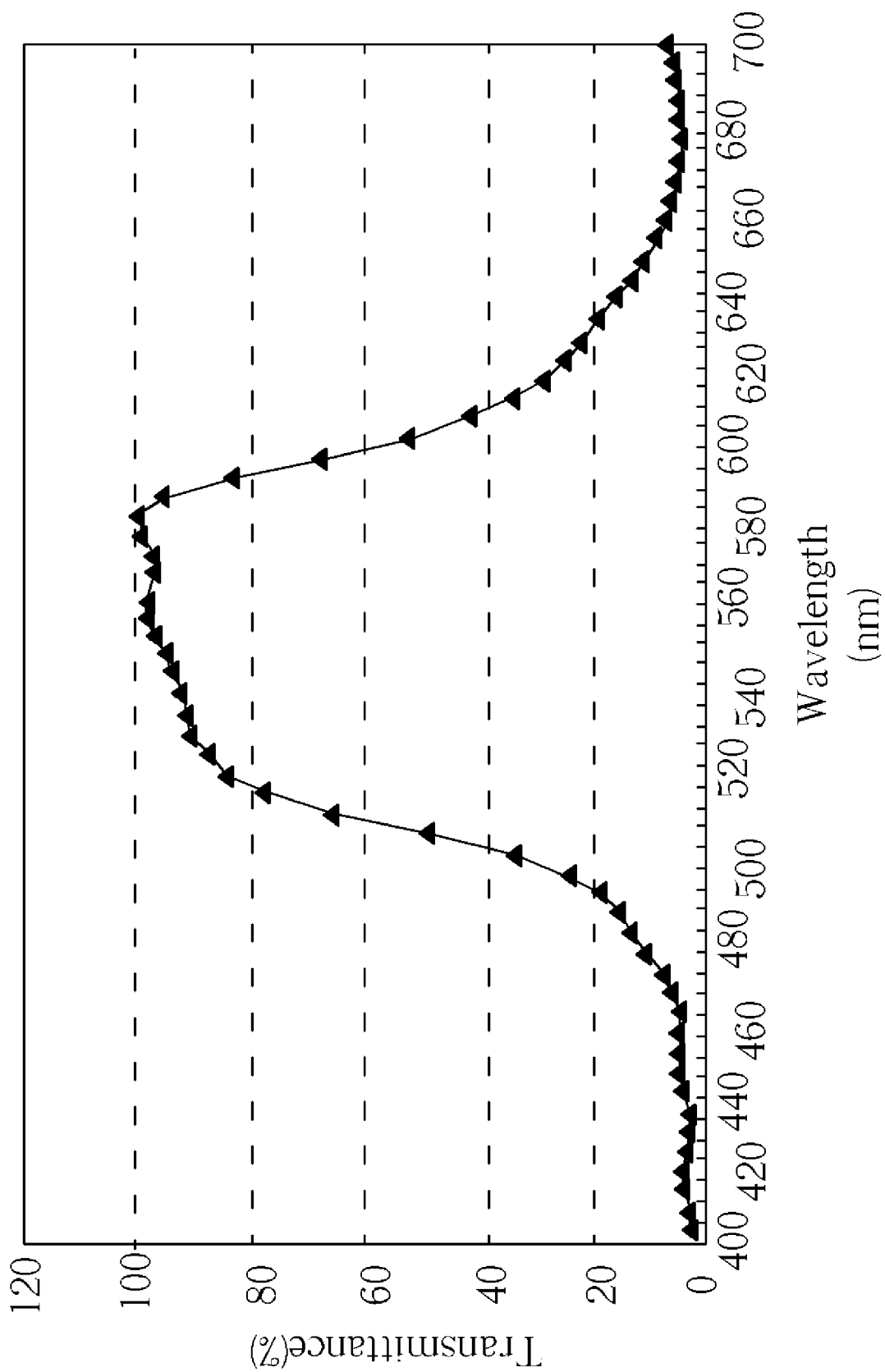
FIG. 8 is a transmission spectrum of the combination of a first stack layer and a second stack layer according to the embodiment of the present invention.

Please refer to FIG. 8, which is a light transmission spectrum of a combination structure of the first stack layer 300 and the second stack layer 400. The abscissa of the spectrum is the wavelength (nm) and the ordinate is the transmittance (%). As shown in FIG. 8, the light having a wavelength of about 500 to 600 nm is transmitted with a transmittance of about 80 to 100%. Namely, the first stack layer 300 and the second stack layer 400 can be stacked together to form another stacked structure for filtering the incident light, to thereby transmit light of about 500 to 600 nm.

In the present specification, the blue wavelength range is defined to be between about 400 to 490 nm, the green wavelength range is defined to be between about 490 to 580 nm, and the red wavelength range is defined to be about 580 to 700 nm. Accordingly, in this embodiment, the color filters comprising the first stack layer 300 are adapted to transmit light in the red wavelength range. The color filters comprising the second stack layer 400 are adapted to transmit light in the blue wavelength range, and the color filters comprising both the first stack layer 300 and the second stack layer 400 are adapted to transmit light in the green wavelength range.

Figure 9:
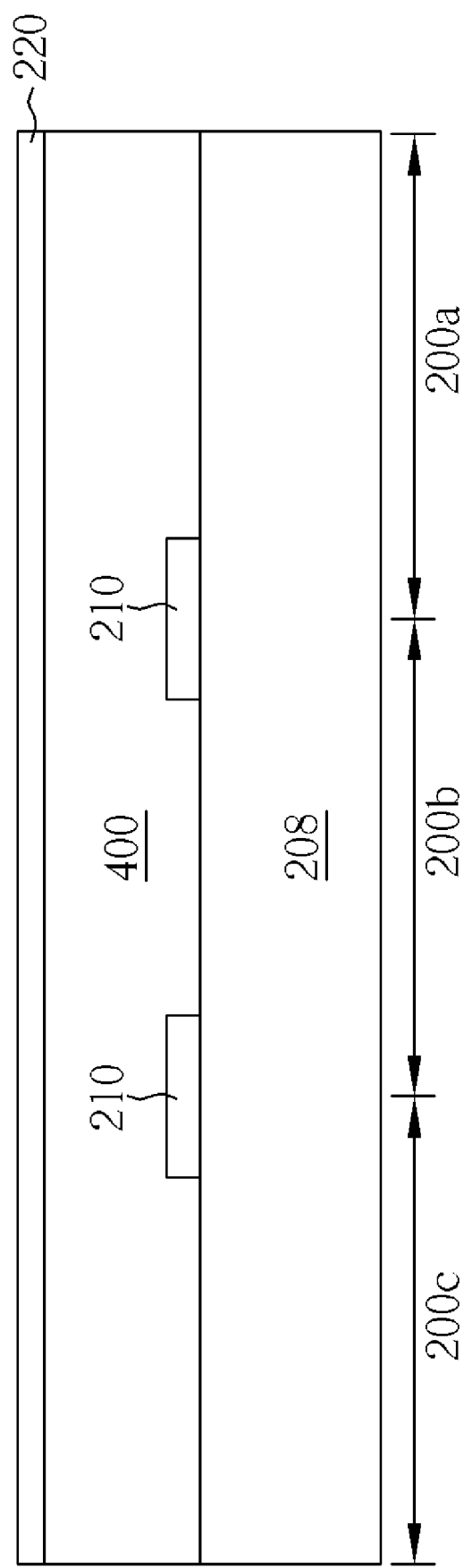
FIG. 9 to FIG. 17 are cross-sectional diagrams, illustrating a fabricating method of a color filter according to the embodiment of the present invention.

Please refer to FIG. 9 to FIG. 17, which are cross-sectional diagrams for illustrating a method for fabricating a color filter according to the embodiment of present invention. For highlighting the characteristic of the present invention and for clarity of illustration, FIG. 9 to FIG. 17 merely show the fabricating method of the insulation layer 208 and the color filter forming layer 212 shown in FIG. 3, and only show a first pixel region 200a, a second pixel region 200b, and a third pixel region 200c. As described above, the color filter 214 of the present invention is fabricated on the semiconductor substrate 202, which comprises the light sensing layer 204 with a plurality of light sensors such as the photodiodes 206. As shown in FIG. 9, an insulation layer 208 is then formed on the light sensing layer 204. According to the preferred embodiment of the present invention, the insulation layer 208 comprises insulating materials such as silicon oxide. The insulation layer 208 includes a plurality of first pixel regions 200a, a plurality of second pixel regions 200b, and a plurality of third pixel regions 200c. Besides, the insulation layer 208 further comprises interconnected metal lines (not shown), and a plurality of first optical shielding layers 210 positioned between each first pixel region 200a, each second pixel region 200b, and each third pixel region 200c. Generally, the first optical shielding layers 210 are made of opaque materials such as titanium/titanium nitride components or metals.

Subsequently, a multiple deposition process is carried out to form a second stack layer 400 as shown in FIG. 6 on the insulation layer 208. Another deposition process is then carried out to form a conformal inorganic layer such as a silicon-oxy-nitride layer 220 on the second stack layer 400. The silicon-oxy-nitride layer 220 is used as a stop layer or hard mask in the subsequent chemical-mechanical polishing (CMP) processes or etching processes. According to the preferred embodiment of the present invention, the silicon-oxy-nitride layer 220 has a thickness of about 1000 to 1300 angstroms.

Figure 10:
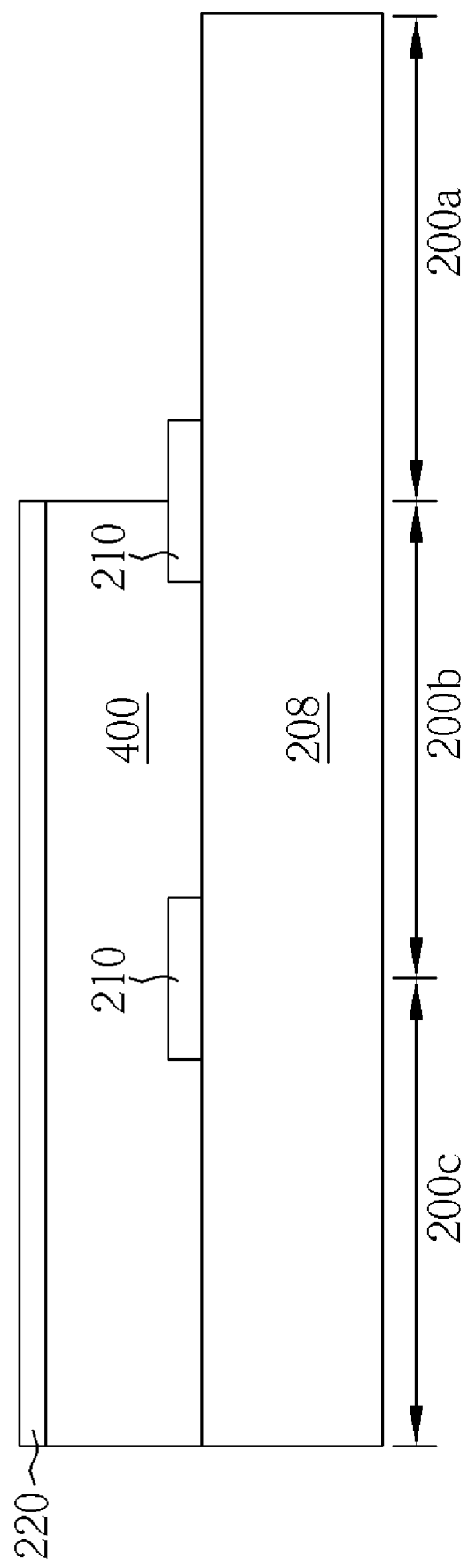

As shown in FIG. 10, a patterned mask (not shown) is coated on the second pixel region 200b and the third pixel region 200c. A single or multiple etching process is/are carried out to remove the second stack layer 400 on the first pixel region 200a. Thereafter, the patterned mask is removed. The aforesaid etching process may be an anisotropic etching such as a sputtering etching process, a plasma etching process, or a reactive ion etching process (RIE process), etc.

Figure 11:
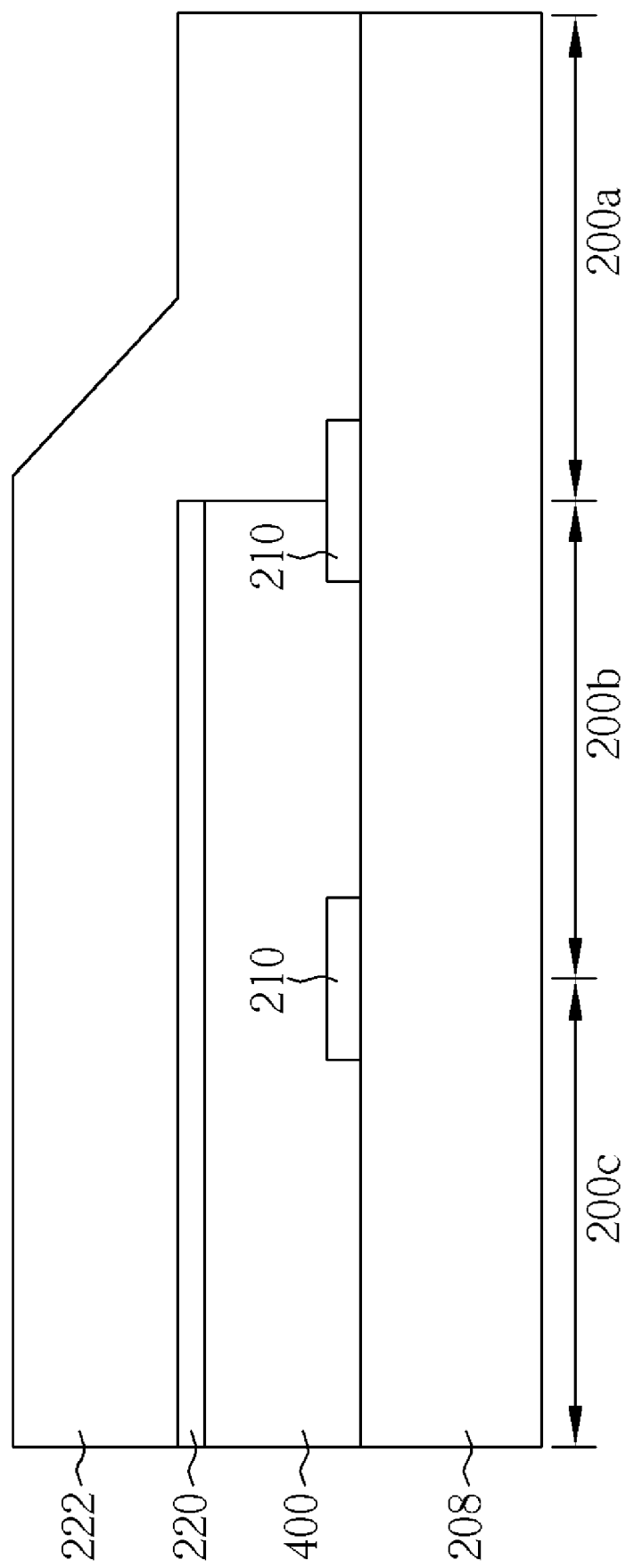

As shown in FIG. 11, a deposition process is carried out to form a conformal dielectric layer such as a silicon oxide layer 222 on the insulation layer 208, and to cover where the second stack layer 400 is removed on the first pixel region 200a. According to the preferred embodiment of the present invention, the silicon oxide layer 222 has a thickness thicker than about 20000 angstroms. The deposition process may be a chemical vapor deposition (CVD), plasma-enhanced CVD (PECVD), or a high density plasma CVD (HDPCVD), etc.

Figure 12:
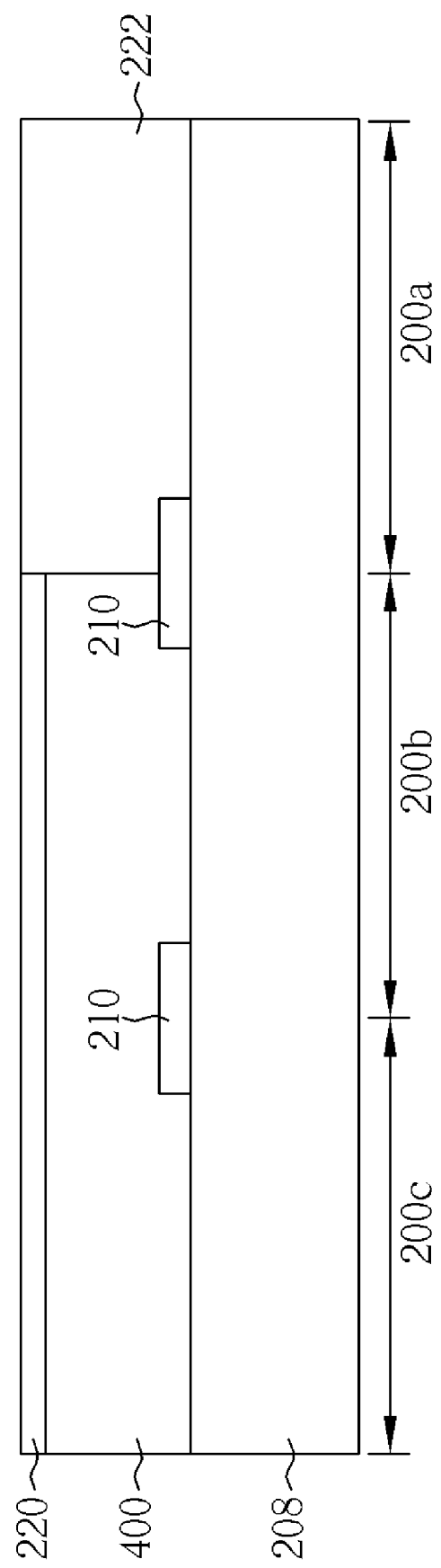

As shown in FIG. 12, a chemical-mechanical polishing process, which may be accompanied with an etching back process, is carried out and using the silicon-oxy-nitride layer 220 as a polishing stop layer to remove the silicon oxide layer 222 on the second pixel region 200b and the third pixel region 200c, thereby obtaining a silicon oxide layer 222 formed on the first pixel region 200a arriving at a same height as that of the second pixel region 200b and the third pixel region 200c, which have the second stack layer instead. Therefore a planar surface is formed on each pixel region, so as to benefit the following deposition processes. It should be notice that in the chemical-mechanical polishing process and the etching back process, the silicon oxide layer 222 on the second pixel region 200b and the third pixel region 200c might not be removed completely, but to be remained with a thickness of 2000 to 3000 angstroms on the silicon-oxy-nitride layer 220, so as to protect the silicon-oxy-nitride layer 220 from being damaged during the following etching processes.

Figure 13:
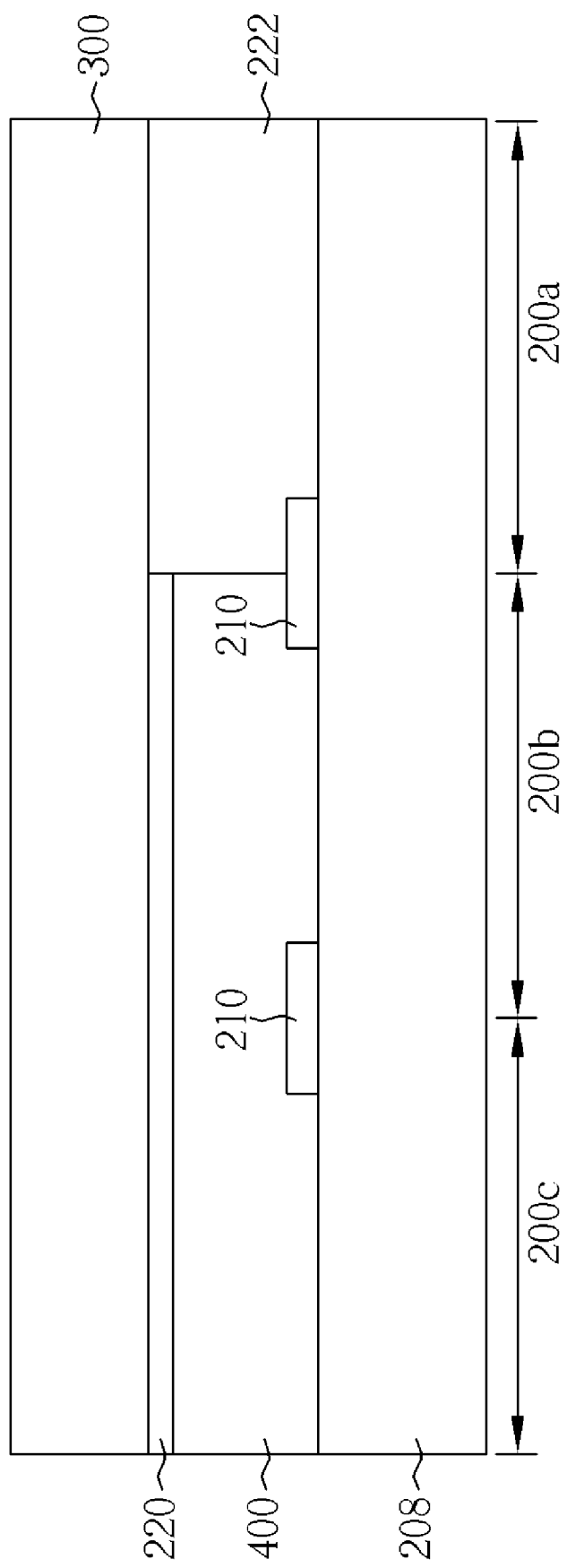

As shown in FIG. 13, a multiple deposition process is carried out to form a first stack layer 300 as shown in FIG. 4 on the first pixel region 200a, the second pixel region 200b, and the third pixel region 200c.

Figure 14:
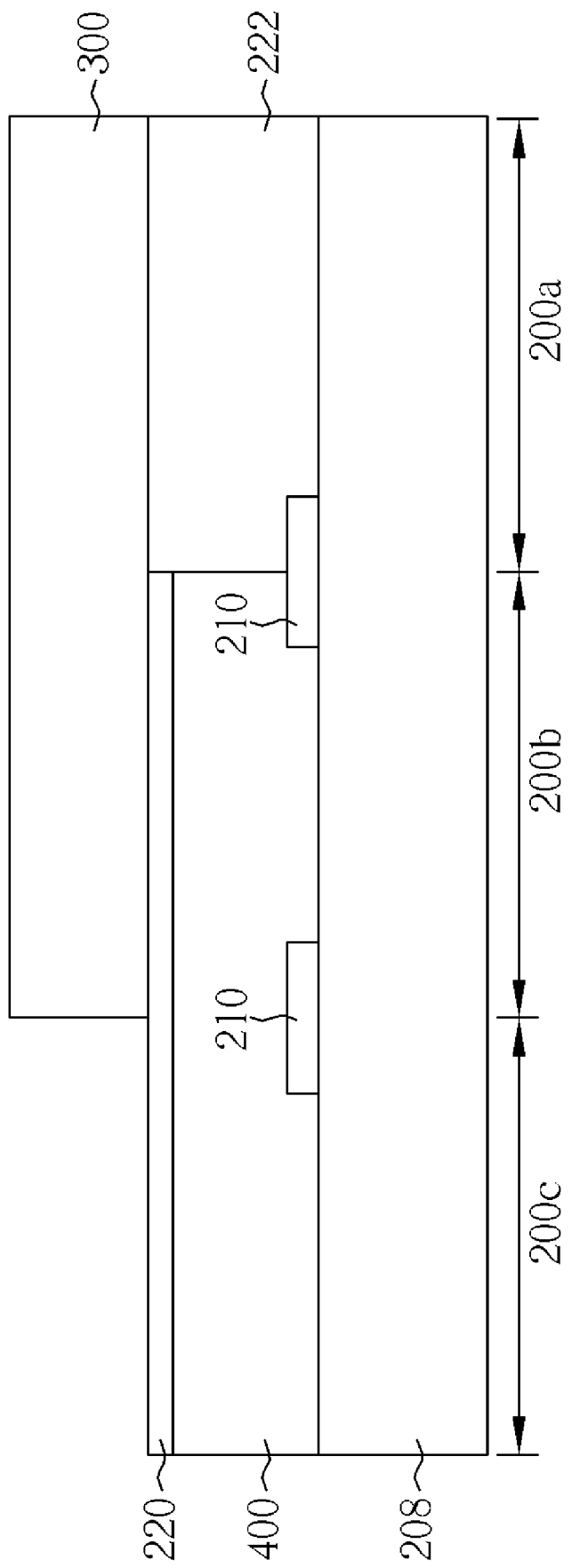

As shown in FIG. 14, a patterned mask (not shown) is coated on the first pixel region 200a and the second pixel region 200b. Subsequently, a single or a multiple etching process using the silicon-oxy-nitride layer 220 as an etching stop layer is/are carried out to remove the first stack layer 300 on the third pixel region 200c. Thereafter, the patterned mask is removed. At this moment, the three pixel regions (i.e. the first pixel region 200a, the second pixel region 200b, and the third pixel region 200c) having the function to differentiate light at three wavelength ranges are formed. The aforesaid etching process may be an anisotropic etching such as a sputtering etching process, a plasma etching process, or a reactive ion etching process (RIE process), etc. Thereafter, a planar layer is deposited and the corresponding micro lenses are then formed. This process is well known by those skilled in the art, and the details of which are not further explained herein for the sake of brevity.

According to the preferred embodiment of the present invention, when an incident light passes through the first pixel region 200a, the second pixel region 200b, and the third pixel region 200c, the incident light 218 is divided into three parts according to the transmission spectrums shown in FIG. 5, FIG. 7, and FIG. 8. Namely, the first pixel region 200a, comprising the first stack layer 300, transmits light with a wavelength higher than about 520 nm (the red wavelength range); the third pixel region 200c, comprising the second stack layer 400, transmits light with a wavelength lower than about 600 nm (the blue wavelength range); and the second pixel region 200b, comprising both the first stack layer 300 and the second stack layer 400, transmits light with a wavelength range between about 500 to 600 nm (the green wavelength range). Subsequently, the charge signals generated by the incident light are converted into a red signal, a green signal, and a blue signal by using the matrix calculations.

It should be noticed that the method for fabricating the color filter as shown in FIG. 9 to FIG. 14 may further include a fourth pixel region. The structure of the fourth pixel region is similar to the structure of the second pixel region 200b, with the only difference being that after the deposition of the first stack layer 300, a multiple deposition process is carried out to form another second stack layer 400 on the fourth pixel region. Therefore, the additional color filter, which is adapted to transmit light in a fourth wavelength range such as in the magenta or yellow wavelength range, etc, is formed. Additionally, a single or a multiple etching process may be carried out to remove some of the inorganic layers in the second stack layer 400. The number of the etching processes and the amount of removal of the inorganic layers can be adjusted according to the acquired transmission spectrum. Therefore, another color filter, which is adapted to transmit light in another wavelength range, is obtained.

Figure 15:
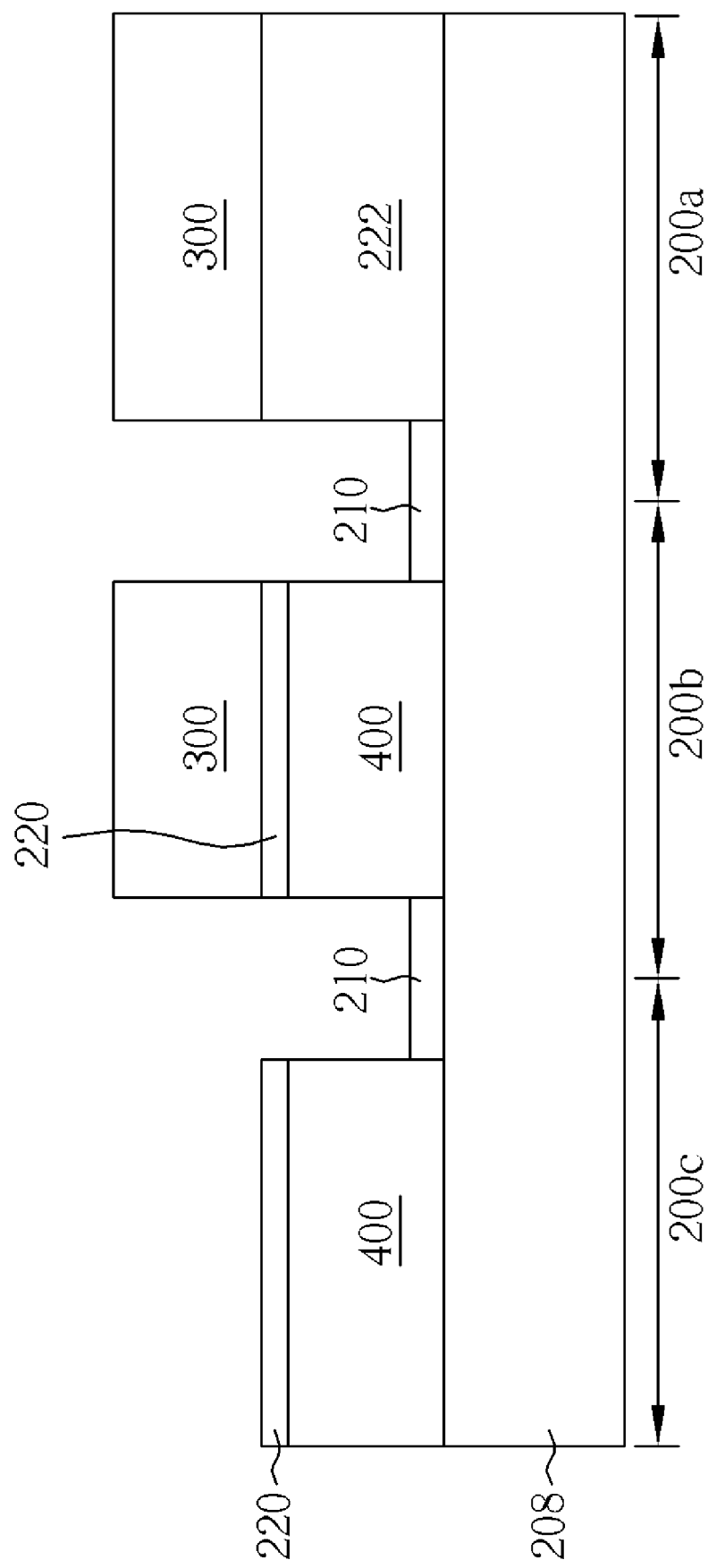
Figure 16:
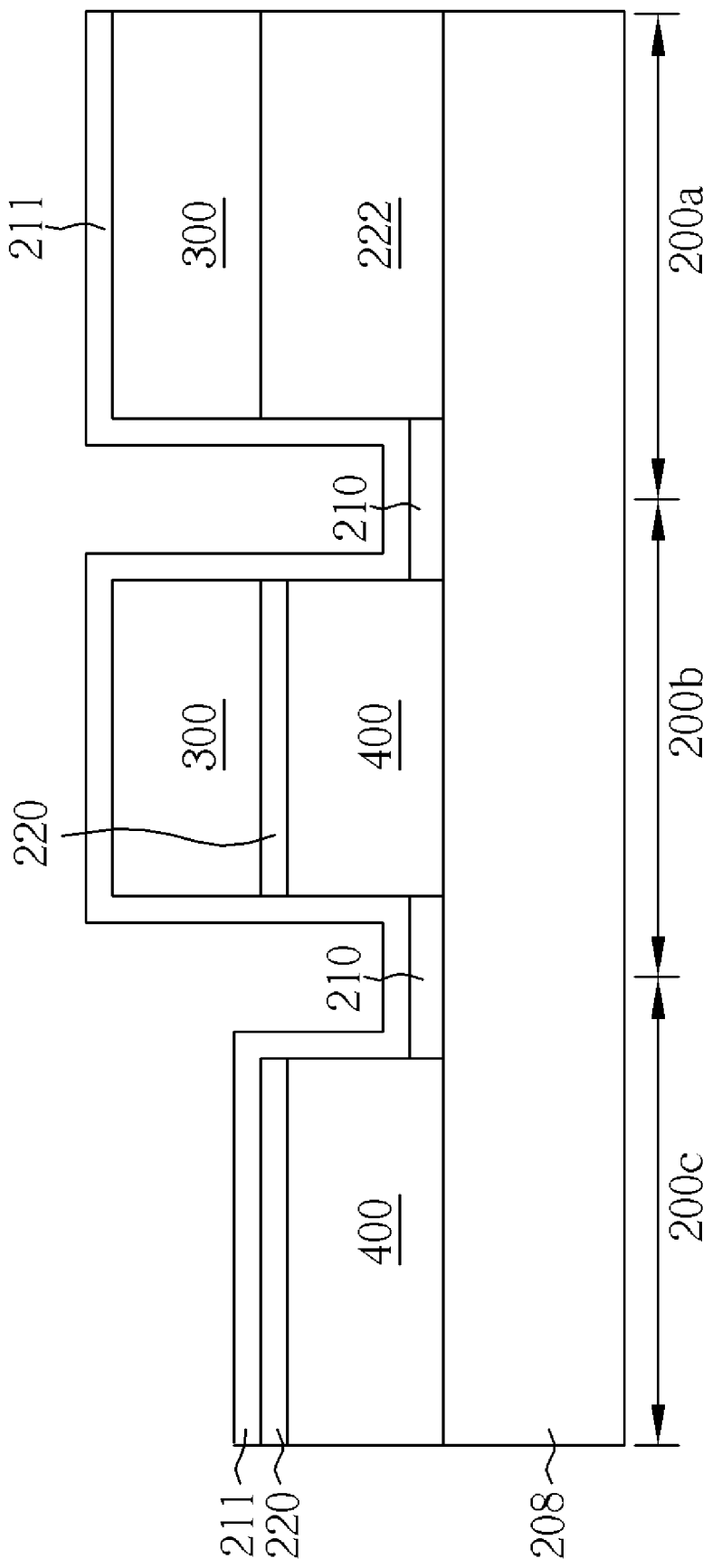
Figure 17:
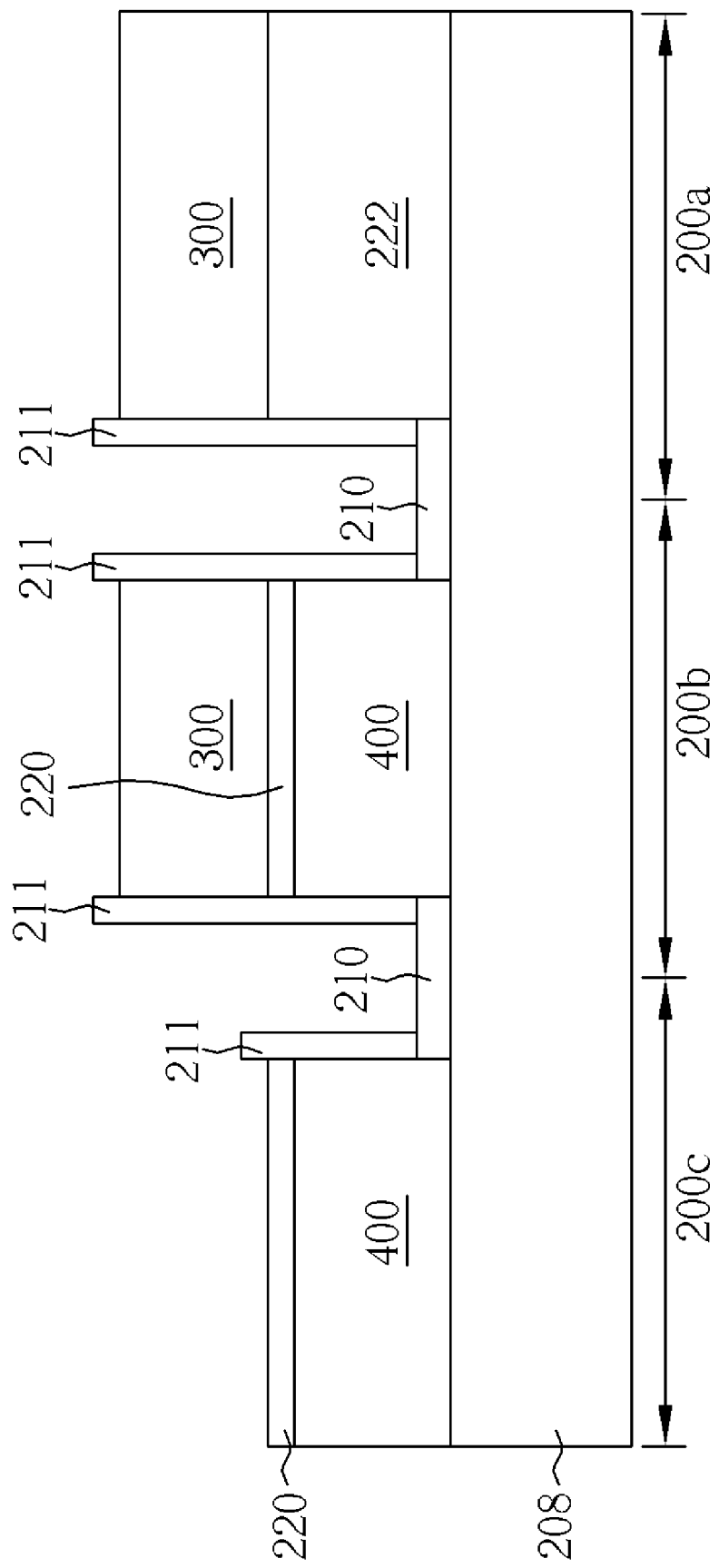

Please refer to FIG. 15 to FIG. 17, which are cross-sectional diagrams for illustrating the method for fabricating a color filter with improved reduced cross-talk according to the embodiment of the present invention. As shown in FIG. 15, a patterned mask (not shown) is coated on the color filter shown in FIG. 14. The patterned mask is coated on the portions in the first pixel region 200a, the second pixel region 200b, and the third pixel region 200c, which do not include the first optical shielding layers 210. An etching process is then carried out to remove the stacked layers above the first optical layers 210, thereby forming a space between each pixel region. Thereafter, the patterned mask is removed. The aforesaid etching process may be an end-point mode, which uses the first optical shielding layer 210 as an etching stop layer; and it stops processing if the signal of the first optical shielding layer 210 is detected. The aforesaid etching process may also be a time mode, and it is accompanied by another over etch process having a predetermined etching time, so as to compensate for the thickness non-uniformity or the other factors resulting from the etching variations.

As shown in FIG. 16, a deposition process is carried out to form a second optical shielding layer 211 that is conformal to cover the stacked layers on the first pixel region 200a, the second pixel region 200b, and the third pixel region 200c. According to the preferred embodiment of the present invention, the second optical shielding layer 211 has a thickness thinner than about 1000 angstroms, and is to not fill the spaces in between each pixel region. Besides, the second optical shielding layer 211 is can be made of opaque materials such as titanium/titanium nitride components or metals.

Finally, as shown in FIG. 17, an etching process is carried out to remove the second optical shielding layer 211 on the first pixel region 200a, the second pixel region 200b, and the third pixel region 200c until the first stack layers 300 on the first pixel region 200a and the second pixel region 200b are exposed, and the silicon-oxy-nitride layer 220 on the third pixel region 200c is exposed. As a result, the second optical shielding layers 211 are formed on the sidewalls in the spaces between each pixel region. Thereafter, a planar layer is deposited; and the corresponding micro lenses are formed. This process is well known by those skilled in the art and the details of which are not further explained herein for the sake of brevity.

One characteristic of the present invention is to form two stack layers from using three kinds of inorganic layers (i.e. silicon nitride, silicon oxide, and silicon-oxy-nitride). Furthermore, three or more color filters are formed by using a plurality of combinations of these two stack layers. Additionally, since the present invention provides the inorganic color filters, thus the problem of the degradation due to light exposure and due to relatively low heat resistances of the organic color filters can be effectively resolved. Consequently, the CMOS image sensors having the inorganic color filters can be applied under higher temperature environment. It should be noticed that the color filters according to the present invention is not limited to the use in the CMOS image sensors, but can also be used in other image sensors such as the charge coupled devices, etc, or in any image displays such as liquid crystal on silicon (LCOS) display panels, etc.

Those skilled in the art will readily observe that numerous modifications and alterations of the device and method may be made while retaining the teachings of the invention.

What is claimed is:

1. A color filter structure, comprising:

a substrate, wherein a plurality of first pixel regions, a plurality of second pixel regions, and a plurality of third pixel regions are defined on the substrate;

each first pixel region comprising a first stack layer, and each first stack layer comprising a plurality of first inorganic layer, a plurality of second inorganic layer, and a plurality of third inorganic layer, wherein the first inorganic layer, the second inorganic layer and the third inorganic layer comprise different inorganic materials;

each second pixel region comprising a second stack layer; and each third pixel region comprising the first stack layer and the second stack layer.

2. The structure of claim 1, wherein in each of the first stack layer, each second inorganic layer and each third inorganic layer are alternately stacked comprising a total stack count of four to eight to form an alternately stacked structure.

3. The structure of claim 1, wherein each first inorganic layer comprising a silicon nitride layer, each second inorganic layer comprising a silicon oxide layer, and each third inorganic layer comprising a silicon-oxy-nitride layer.

4. The structure of claim 1, wherein each first pixel region further comprises a silicon oxide layer disposed between the substrate and each first stack layer.

* * * * *